(12) United States Patent  
Kime

(10) Patent No.: US 6,510,930 B2
(45) Date of Patent: Jan. 28, 2003

(54) FLOATING ROD GUIDE

(75) Inventor: Aaron A. Kime, Monroe, OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/845,516

(22) Filed: Apr. 30, 2001

(65) Prior Publication Data

US 2002/0157910 A1 Oct. 31, 2002

(51) Int. Cl.⁷ ................................................ F16F 9/36
(52) U.S. Cl. ............................. 188/322.17; 188/322.19
(58) Field of Search ...................... 188/322.17, 322.16, 188/322.19

(56) References Cited

U.S. PATENT DOCUMENTS

| 3,763,971 | A | * | 10/1973 | Saner ..................... 188/322.17 |
| 3,771,629 | A | * | 11/1973 | Fader et al. ............ 188/322.17 |
| 4,071,057 | A | * | 1/1978 | Nagase .................. 188/322.17 |
| 4,331,224 | A | * | 5/1982 | Sano ....................... 188/322.1 |
| 4,989,701 | A | * | 2/1991 | Yamaoka et al. ...... 188/322.17 |
| 5,207,301 | A | | 5/1993 | Kruckemeyer et al. ..... 188/299 |
| 5,339,932 | A | * | 8/1994 | Lanterman ............. 188/322.17 |
| 5,533,598 | A | * | 7/1996 | Adrian et al. .......... 188/322.17 |
| 5,690,195 | A | | 11/1997 | Kruckemeyer et al. ..... 188/299 |
| 5,706,919 | A | | 1/1998 | Kruckemeyer et al. ..... 188/299 |
| 6,105,739 | A | * | 8/2000 | Deppert ................. 188/322.17 |
| 6,119,832 | A | | 9/2000 | Hofmann .................... 188/322 |
| 6,318,526 | B1 | * | 11/2001 | Kruckemeyer et al. 188/322.17 |

* cited by examiner

Primary Examiner—Jack Lavinder
Assistant Examiner—Robert A. Siconolfi
(74) Attorney, Agent, or Firm—Scott A. McBain

(57) ABSTRACT

A vibration damper for a motor vehicle includes an inner tube concentrically aligned within an outer housing. A piston shaft having a piston attached at an end thereof is slidably inserted into the inner housing. A support ring encloses the inner housing defining a pumping chamber inside the inner housing. The piston shaft is inserted through the support ring. The support ring includes a seal cover having an inner surface with a rim. A rod guide is inserted into the seal cover and abuts the rim. The rod guide guides the shaft through the support ring and provides lateral support to the shaft. A retainer sleeve is secured to the rod guide having the rim disposed between the rod guide and the retainer sleeve securing the rod guide to the retainer sleeve.

18 Claims, 2 Drawing Sheets

FLOATING ROD GUIDE

TECHNICAL FIELD

The present invention relates generally to an improved vibration damper for a motor vehicle suspension system. More specifically, the present invention relates to an improved floating rod guide for the vibration damper.

BACKGROUND OF THE INVENTION

Vibration dampers are used in shock absorbing systems connected to motor vehicles to dissipate vibrational and other forces. Such vibration dampers are used to absorb shock loads sustained by the wheel assemblies of such vehicles and are used in combination with coil springs to dissipate vibration generated from such variables as rough road surfaces, potholes, and unbalanced tires. These dampers typically operate by transmitting the applied forces to a piston slideably mounted in a fluid filled chamber in the damper. As the piston strokes through the chamber, the fluid in the chamber is forced through and around the piston. The resistance of the piston to movement through the fluid in the chamber is proportional to the applied force. Accordingly, these forces are dampened, thereby reducing the amount of vibration transferred to the passenger compartment.

Strut or shock type dampers may include a rod guide assembly that guides and centers the piston shaft and the piston as they stroke within an inner tube. When lateral or "side load" forces are applied to the damper, the piston shaft and the piston may be shifted away from the radial center of the damper. Furthermore, deviations in tolerance in the various components of the damper can also shift the piston shaft and the piston off center. Radial misalignment of the rod and the piston within the damper causes the shaft to rub against the rod guide as it strokes within the inner tube, which increases wear on the piston shaft and the rod guide. This is particularly undesirable in dampers containing magnetorheological fluid because the suspended magnetic particles can be abrasive to the piston shaft. Further, when the shaft is laterally displaced, the shaft can engage and laterally displace the rod guide, which in turn shifts the inner tube from the radial center of the damper. Radially shifting any of the components in the vibration damper increases wear upon the various bearings, seals, and sleeve supports inside the damper effectively reducing the service life.

In order to prevent undue wear to the piston shaft, some vibration dampers are provided with an outer housing bearing, and a bracket adjacent its lower end for attachment to a vehicle wheel suspension assembly. One end of the piston shaft is fixed to the middle of the damper base, and the shaft projects upwardly into the inner tube containing the piston and the fluid. The top of the inner tube is fixed to the vehicle body, so that the shaft and the piston move axially together with the outer housing and a wheel assembly in opposition to the inner tube and the vehicle body. Side loads to the damper are received by bearing elements between the inner tube and the outer housing, and very little of the side loads are thus applied to the shaft. However, a support must be provided to close and seal the bottom of the inner shaft against loss of the working fluid. Further, the support ring must accommodate the stroking action of the shaft therethrough.

The support ring includes a rod guide and seal assembly, which, although relieved of most of its side loads, still includes a bearing and a seal in contact with the shaft. The rod guide and the seal assembly thus provide a third point of radial support for the rod between the point of attachment to the damper base at the bottom and the piston at the top. If manufacturing tolerances or other factors cause the rod guide to be laterally misaligned with these other supports, it may cause undesirable wear between itself and the piston shaft.

It is imperative for the rod guide and seal assembly to accommodate manufacturing tolerances in lateral alignment with other rod support apparatus while providing secure sealing around an axially moving piston shaft to maintain the working fluid within the working chambers of the damper.

To facilitate the lateral alignment and the sealing function around the piston shaft, a complex support ring has been introduced into vibration dampers of this type. These support rings include moveable components that utilize an empty volume within a housing support ring. The empty housing is filled with grease to impede fluid penetration into the support ring. However, iron particles suspended in the fluid, i.e. M.R. Fluid, can collect within the support ring thereby immobilizing the piston shaft and making it non-functional. Additionally, during manufacturing of the vibration damper the grease application is a difficult and messy operation which requires additional tooling. Furthermore, redundant seals are required on either side of the piston shaft to prevent fluid leaks into the support ring. These redundant seals increase the sliding friction on the piston shaft causing undue side load and wear in the vibration damper.

Therefore, it would be desirable to introduce a support ring to the vibration damper that is mechanically simple and yet, provides the lateral support required to maintain functionality of the vibration damper.

SUMMARY OF THE INVENTION

The present invention comprises a vibration damper having an inner tube concentrically aligned within an outer housing. A piston shaft having a piston attached at an end thereof is inserted into the inner housing. The piston strokes within the inner tube, which is filled with fluid, and thereby reduces the vibrational forces derived from such variables as rough road surfaces, potholes, and unbalanced tires. A support ring encloses the inner tube, thereby defining a pumping chamber within the inner tube. The piston shaft is inserted through the support ring which provides lateral support to the piston shaft. The support ring includes a seal cover, which has an inner surface with a rim. A rod guide is inserted into the sealed cover and abuts the rim. The rod guide includes a central aperture into which the piston shaft is inserted. The rim is sandwiched between the rod guide and a washer onto which the rod guide is affixed. The rod guide floats within the circumference of the rim providing lateral motion to the piston shaft.

The present invention eliminates the manufacturing and performance problem associated with the prior art support rings. By affixing the rod guide to the washer and sandwiching the rim therebetween, the empty volume associated with the prior art can be eliminated. Further, because there is no empty volume inside the support ring, the redundant seals may be eliminated. Still further, the design of the present invention provides a lateral support equal to the complex designs used in the prior art support rings.

BRIEF DESCRIPTION OF THE DRAWINGS

Other advantages of the present invention will be readily appreciated as the same becomes better understood by reference to the following detailed description when considered in connection with the accompanying drawings wherein.

DESCRIPTION OF THE PREFERRED EMBODIMENT

Figure 1:
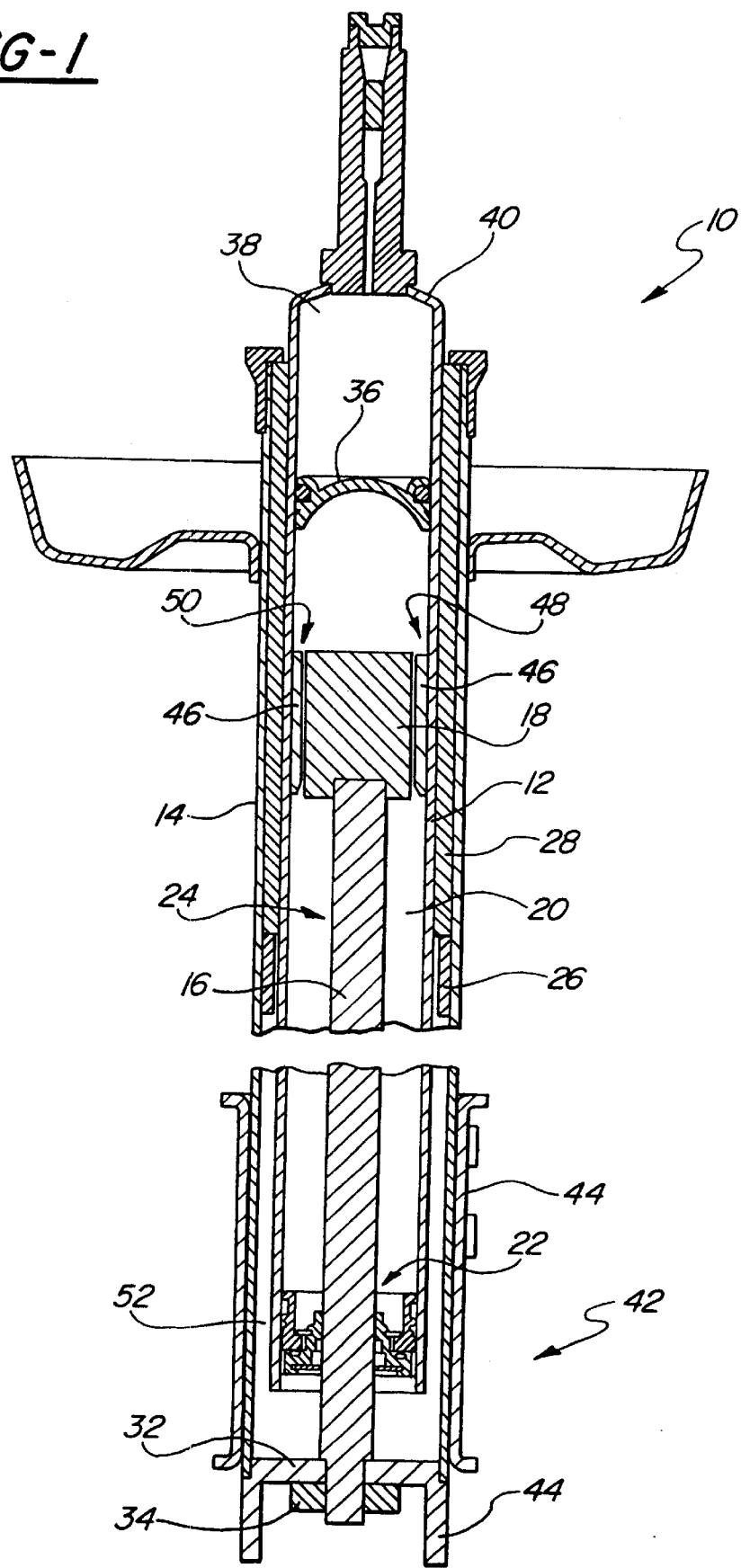
FIG. 1 is a sectional view of a vibration damper showing the support ring of the subject invention.

Referring to FIG. 1, the vibration damper of the present assembly is generally shown at 10. The assembly is represented in FIG. 1 as a monotube strut. However, it should be understood that the present invention may also be used with certain shocks, as well as a variety of other applications beyond struts, shocks or dampers. The assembly includes an inner tube 12 that is concentrically aligned within an outer housing 14. A piston shaft 16 extends into the inner tube 12 and has a piston 18 attached at the end thereof. The piston 18 strokes inside the inner tube 12 proportional to the amount of vibration received from such variables as rough road surfaces, potholes, and unbalanced tires. Damping fluid 20 is disposed inside the inner tube 12. The damping fluid 20 resists the stroking action of the piston 18, thereby absorbing the vibration forces from the vibration inducing variables. The damping fluid 20 can take the form of the conventional fluid or a magnetorheological (MR) fluid, which properties are adjusted when subjected to a magnetic flux. A support ring 22 is received by the inner tube 12 and prevents the damping fluid 20 from leaking from a pumping chamber 24 defined by the inner tube 12 and the support ring 22. The piston extends into the pumping chamber 24 defining a first pumping chamber and a second pumping chamber.

The inner tube 12 is concentrically aligned inside of and is axially movable relative to the outer housing 14. A bearing sleeve support 26 and a set of model tube seals and bearings 28 are positioned between the inner tube 12 and the outer housing 14. The bearing sleeve 26 and the model tube seals and bearings 28 guide the relative movement between the inner tube 12 and the outer housing 14.

The piston shaft 16 extends out of the pumping chamber 24 and includes a nut 34 disposed on the opposite end thereof from the piston 18. The nut 34 affixes the piston shaft 16 to a strut base 32. Thus, when the outer housing 14 moves relative to the inner tube 12, the piston shaft 16 and the piston 18 move axially within the inner tube 12 relative to the movement of the outer housing 14.

A slideable gas cup 36 is located in the inner tube 12. The gas cup 36 seals a pressure cavity 38 from the pumping chamber 24. The pressure cavity 38 is filled with pressurized gas, such as, for example, nitrogen or an equivalent. Therefore, the inner tube 12 includes two chambers, a pressure cavity 38 and a pumping chamber 24. The pressure cavity 38 is located at an end of the inner tube 12 that is opposite the support ring 22. An upper end 40 of the inner tube 12 is connected to a frame of the vehicle (not shown). A lower end 42 of the outer housing 14 is connected to the vehicle wheel suspension assembly (not shown) by a bracket 44. Accordingly, when the wheel suspension assembly transmits vibrational load to the bracket 44, and thereby to the outer housing 14, the outer housing 14, the piston shaft 16, and the piston 18 are axially stroked upwardly relative to the inner tube 12.

As is known in the art of vibration damping, the piston 18 includes an annular bumper 46 and a pair of longitudinally-extending internal orifices 48, 50. The movement of the piston 18 within the inner-tube 12 forces the damping fluid 20 through the orifices 48, 50 in the piston 18 damping the movement of the piston 18, the piston shaft 16, and the outer housing 14. As the piston 18 moves within the inner tube 12, the gas cup 36 also moves within the inner tube 12 to accommodate the change in volume in the pumping chamber 24 as the shaft 16 strokes into and out of the inner tube 12.

Figure 2:
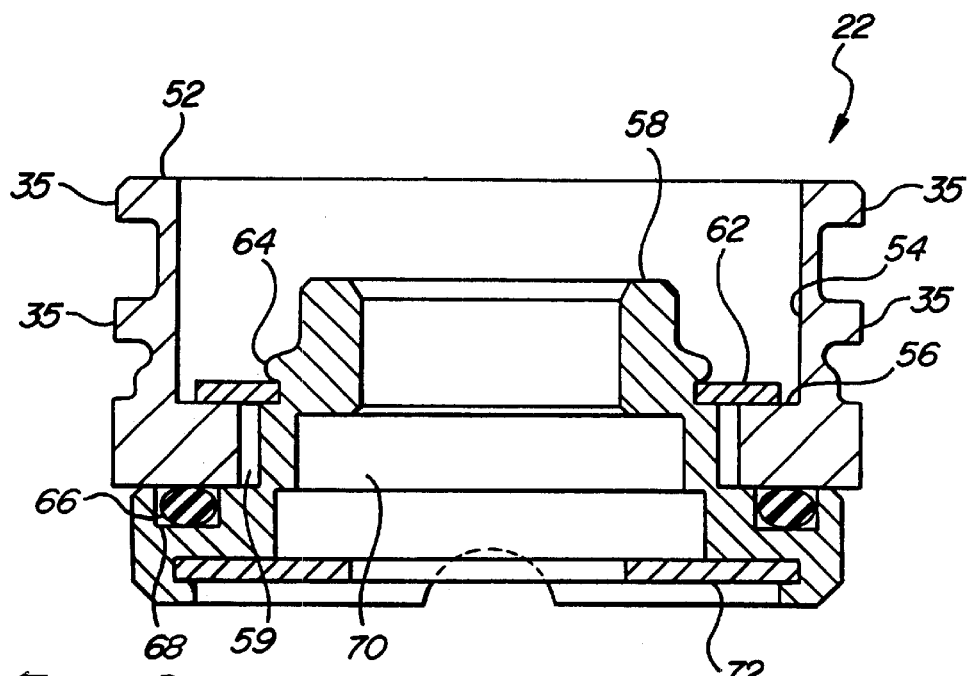
FIG. 2 is a sectional view of a preferred embodiment of the support ring of the present invention.

Referring to FIG. 2, the preferred embodiment of the support ring 22 is generally shown. The support ring 22 includes a seal cover 52. Flanges 35 circumscribe the seal cover 52 and wedge inside the inner tube 12 securing the support ring 22 to the inner tube 12. The seal cover 52 is generally tubular in shape and includes an inner surface 54 with an annular rim 56. A rod guide 58 is received by the seal cover 52 and abuts the annular rim 56. The inner diameter of the rim 56 is greater than the outer diameter of the rod guide 58 defining a space 59 therebetween. Therefore, the rod guide 58 floats laterally inside the seal cover 52. The piston shaft 16 is slideably inserted through the rod guide 58 allowing the piston shaft 16 to stroke independently of the inner tube 12. A retainer sleeve 62 or washer is affixed to the rod guide 58 so that the armular rim 56 is sandwiched therebetween. Preferably the washer 62 is affixed to the rod guide 58 by swaging. More specifically, the rod guide 58 includes a swaged section 64 for securing the washer 62 to the rod guide 58. A pliant O-ring 68 is received in a groove 66 in the rod guide 58. The O-ring 68 seals the rod guide 58 to the annular rim 56, thereby preventing the damping fluid 20 from entering the support ring 22. A seal is received by the rod guide 58, and is coaxially aligned with the rod guide 58. The piston shaft 16 is therefore, slideably inserted through the seal 70 along with the rod guide 58. The seal 70 prevents damping fluid 20 from leaking out of the pumping chamber 24. A seal retainer 72 secures the seal 70 to the rod guide 58. Preferably, the seal retainer 72 is secured to the rod guide 58 by radial riveting. However, other equally effective methods of attachment may be used.

Figure 3:
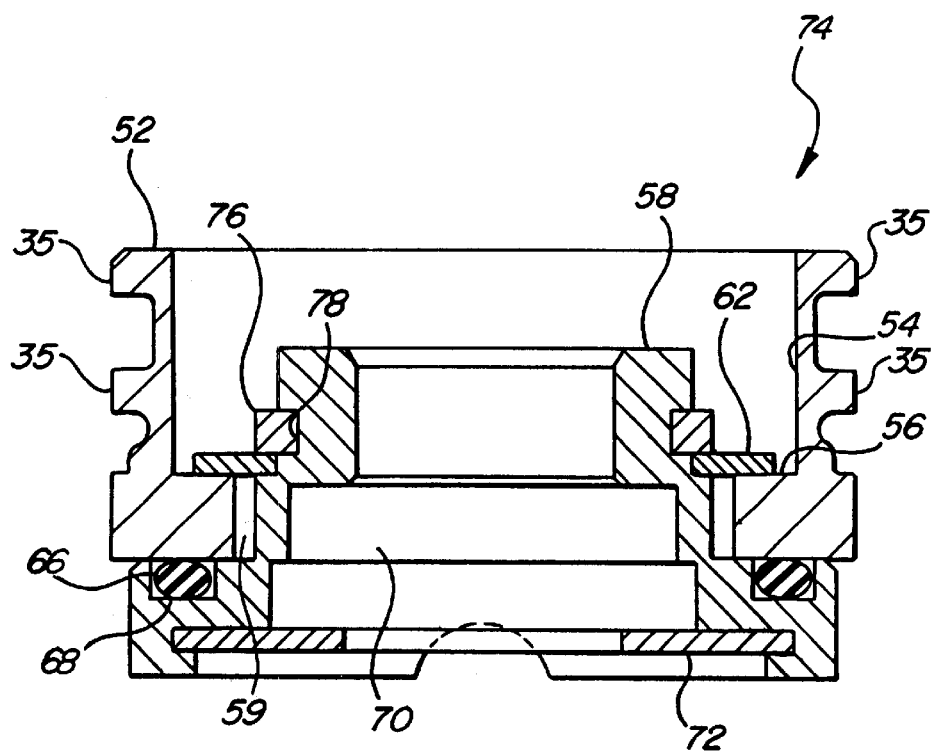
FIG. 3 is a sectional view of an alternate embodiment of the support ring of the present invention.

FIG. 3 shows an alternate embodiment of the support ring 74. A snap ring 76 replaces the swaged section 64 of the preferred embodiment to secure the washer 62 to the rod guide 58. The snap ring 76 snaps into a groove 78 in the rod guide 58 locking the rod guide 58 to the washer 62.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims the invention may be practiced otherwise than as specifically described.

What is claimed is:

1. A vibration damper assembly comprising:
   an inner housing concentrically aligned within an outer housing along an axis and having fluid disposed therein;
   a support ring enclosing said inner housing thereby defining a pumping chamber for the fluid;
   a piston shaft, having a piston, inserted through said support ring such that said piston is disposed in said pumping chamber for defining a first pumping chamber and a second pumping chamber with said piston moving the fluid between said first and second pumping chambers in response to axial movement of said piston shaft within said inner housing;
   said support ring including:
      a seal cover having an inner surface with a rim;

a rod guide inserted into said seal cover abutting a portion of said rim, wherein said rod guide guides said shaft through said support ring and moves within said seal cover in a lateral direction relative to said axis; and a retainer sleeve secured to said rod guide and interengaging said seal cover and said rod guide such that said rim is disposed between said rod guide and said retainer sleeve wherein said rod guide is first inserted into said seal cover and said retainer sleeve is then secured to said rod guide such that said support ring can be easily assembled, said retainer sleeve movably securing said rod guide to said seal cover for providing movement of said rod guide within said seal cover in a lateral direction relative to said axis and preventing movement of said rod guide within said seal cover in a longitudinal direction relative to said axis.

2. An assembly as set forth in claim 1 wherein said rod guide and said seal cover define an annular space therebetween allowing said rod guide to float inside said seal cover in an annular direction.

3. An assembly as set forth in claim 1 including a seal coaxially inserted into said rod guide for sealing said piston shaft to said support ring.

4. An assembly as set forth in claim 3 including a seal retainer being affixed to said rod guide over said seal thereby securing said seal to said support ring.

5. An assembly as set forth in claim 4 wherein said seal retainer is riveted to said rod guide.

6. An assembly as set forth in claim 1 wherein said rod guide includes an abutment portion engaging an outer edge of said rim.

7. An assembly as set forth in claim 5 including an O-ring nested between said rod guide and said seal cover for sealing said rod guide to said seal cover.

8. An assembly as set forth in claim 1 wherein said rod guide is swaged to said retainer sleeve.

9. An assembly as set forth in claim 1 including a snap ring circumscribing said rod guide and engaging said retainer sleeve thereby securing said rod guide to said retainer sleeve.

10. An assembly as set forth in claim 1 wherein said rod guide includes a locking portion extending into said seal cover with said retainer sleeve being secured to said locking portion.

11. An assembly as set forth in claim 10 wherein locking portion is further defined as a swaged section.

12. An assembly as set forth in claim 1 including a snap ring mounted to said rod guide and engaging said retainer sleeve for securing said retainer sleeve to said rod guide.

13. A vibration damper assembly comprising:

an inner housing concentrically aligned within an outer housing;

a piston shaft having a piston attached at an end thereof and being inserted into said inner housing;

a support ring enclosing said inner housing thereby defining a pumping chamber within said inner housing, and having said piston shaft inserted therethrough;

said support ring including:
a seal cover having an inner surface with a rim;
a rod guide inserted into said seal cover abutting said rim, wherein said rod guide guides said shaft through said support ring;
a retainer sleeve secured to said rod guide, wherein said rim is disposed between said rod guide and said retainer sleeve thereby securing said rod guide to said seal cover; and
a seal coaxially inserted into said rod guide for sealing said piston shaft to said support ring.

14. A vibration damper assembly comprising:

an inner housing concentrically aligned within an outer housing along an axis and having fluid disposed therein;

a support ring enclosing said inner housing thereby defining a pumping chamber for the fluid;

a piston shaft, having a piston, inserted through said support ring such that said piston is disposed in said pumping chamber for defining a first pumping chamber and a second pumping chamber with said piston moving the fluid between said first and second pumping chambers in response to axial movement of said piston shaft within said inner housing;

said support ring including:
a seal cover having an inner surface with a rim;
a rod guide inserted into said seal cover abutting said rim, wherein said rod guide guides said shaft through said support ring and moves within said seal cover in a lateral direction relative to said axis;
a retainer sleeve secured to said rod guide and interengaging said seal cover and said rod guide such that said rim is disposed between said rod guide and said retainer sleeve thereby movably securing said rod guide to said seal for providing movement of said rod guide within said seal cover in a lateral direction relative to said axis and preventing movement of said rod guide within said seal cover in a longitudinal direction relative to said axis; and
a seal coaxially inserted into said rod guide for sealing said piston shaft to said support ring.

15. An assembly as set forth in claim 14 wherein said rod guide includes an abutment portion engaging an outer edge of said rim.

16. An assembly as set forth in claim 14 wherein said rod guide includes a locking portion extending into said seal cover with said retainer sleeve being secured to said locking portion.

17. An assembly as set forth in claim 16 wherein locking portion is further defined as a swaged section.

18. An assembly as set forth in claim 14 including a snap ring mounted to said rod guide and engaging said retainer sleeve for securing said retainer sleeve to said rod guide.

* * * * *